United States Patent
Watkinson (10) Patent No.: US 7,519,662 B2
(45) Date of Patent: Apr. 14, 2009

(54) SYSTEM AND METHOD FOR CONVERTING REQUESTS BETWEEN DIFFERENT MULTICAST PROTOCOLS IN A COMMUNICATION NETWORK

(75) Inventor: David A. Watkinson, Kanata (CA)

(73) Assignee: Alcatel-Lucent Canada Inc., Kanata, Ontario (CA)

( * ) Notice: Subject to any disclaimer, the term of this patent is extended or adjusted under 35 U.S.C. 154(b) by 0 days.

(21) Appl. No.: 11/698,082

(22) Filed: Jan. 26, 2007

(65) Prior Publication Data

US 2007/0124454 A1 May 31, 2007

Related U.S. Application Data

(63) Continuation of application No. 10/323,633, filed on Dec. 20, 2002, now Pat. No. 7,233,987.

(51) Int. Cl.
G06F 15/13 (2006.01)
(52) U.S. Cl. ............... 709/204; 709/203; 709/205; 709/206; 370/389; 370/390; 370/400
(58) Field of Classification Search ......... 709/203, 709/204, 205, 206; 370/389, 390, 400
See application file for complete search history.

(56) References Cited

U.S. PATENT DOCUMENTS 6,331,983 B1 * 12/2001 Haggerty et al. ............ 370/400
6,847,638 B1 * 1/2005 Wu et al. .................... 370/389
6,853,639 B1 * 2/2005 Watanuki et al. ............ 370/390
2003/0018715 A1 * 1/2003 O'Neill ...................... 709/204
2004/0022244 A1 * 2/2004 Boers et al. ................. 370/390
2005/0091313 A1 * 4/2005 Zhou et al. .................. 709/204

FOREIGN PATENT DOCUMENTS

EP  1 424 806 A1  6/2004
EP  1 587 243 A1  10/2005

OTHER PUBLICATIONS

Cain, B., et al., "Internet Group Management Protocol, Version 3", Network Working Group, Oct. 2002.
Fenner, W., "Internet Group Management Protocol, Version 2", Network Working Group, Nov. 1997.
Deering, S., "Host Extensions for IP Multicasting", Network Working Group, Aug. 1989.
Holbrook, H., "Using IGMPv3 for Source-Specific Multicast", http://watersprings.org, Mar. 2, 2000.
Shepherd, Greg, et al., "Source-Specific Protocol Independent Multicast in 232/8", Network Working Group, Apr. 2001.

* cited by examiner

Primary Examiner—Jinsong Hu (57) ABSTRACT

The invention provides a system and method for generating and evaluating a request in a protocol from another request formed in another protocol. Therein, the request relates to a change of membership to a group and the group relates a service to a host of the service in a communication network. In particular, the method comprises receiving said request, identifying a target group from said request, identifying an associated host to said target group and generating in another protocol another request containing a reference to said target group and said associated host. The request identifies said group and does not uniquely identify said associated host. The invention provides the ability to block a request from proceeding further if it does not belong to a recognized group.

15 Claims, 3 Drawing Sheets

SYSTEM AND METHOD FOR CONVERTING REQUESTS BETWEEN DIFFERENT MULTICAST PROTOCOLS IN A COMMUNICATION NETWORK

This application is a continuation of U.S. patent application Ser. No. 10/323,633, filed Dec. 20, 2002, now U.S. Pat. No. 7,233,987 and incorporated herein by reference.

FIELD OF THE INVENTION

The invention relates generally to data communications, in particular to a system and method for interfacing between routers and hosts running internet group management protocols.

BACKGROUND OF THE INVENTION

Digital media services provide subscribers with access to downloadable video information, such as television programs, movies, audio programs and text-based information streams. Typically, subscribers selectively access such services via a connection to a communication network. In the network, the services are provided from one or more information sources. Routers in the network are coupled to both the sources and the subscribers; the routers provide linking interfaces to enable the sources to transmit their services to the intended subscribers in the network.

Generally, when services are provided to a specific list of subscribers in a network, a multicast transmission is used. Therein, one router transmits messages to multiple destinations. For multicast transmissions, a router requires group information identifying members of a group which are to receive a specified multicast transmission. In an Internet Protocol (IP) v4 network, Internet Group Management Protocol (IGMP) commands are sent from hosts to routers in the network to manage IP multicast transmissions. IGMP is an evolving protocol. The Internet Engineering Task Force (IETF) has published numerous specifications for IGMP, as its standards evolve, including: RFC 1112, entitled "Host Extensions for IP Multicasting"; RFC 2236, entitled "Internet Group Management Protocol, Version 2"; and RFC 3376 entitled "Internet Group Management Protocol, Version 3". All three specifications are incorporated herein by reference. IGMP, version 2 is designed to be interoperable with Protocol Independent Multicast-Sparse Mode (PIM-SM) multicasting. IGMP, version 3 adds the capability for Protocol Independent Multicast-Single Source Multicast (PIM-SSM) multicasting. PIM-SSM provides simplified processing in both the data plane and the control plane over PIM-SM. Unfortunately, some mapping constructs of IGMP v3 are not compatible with IGMP v2. This is problematic when a legacy host, which recognizes only IGMP version 2 protocol commands, is connected to a network which utilizes PIM-SSM.

Therefore, a need exists for a method and apparatus for supporting multicast group transmissions that provides PIM-SSM compatibility with legacy protocols.

SUMMARY OF THE INVENTION

In a first aspect, a method of generating a request in a protocol from another request formed in another protocol is provided. The request is related to a membership change to a group and the group is related a service provided by a host in a communication network. The method comprises receiving the request, identifying a target group from the request, identifying an associated host to the target group and generating in another protocol, another request containing a reference to the target group and the associated host. For the method, the request identifies the group and does not uniquely identify the associated host.

The service in the method may relate to a multicast transmission in the network.

The method may have the host identified by accessing data relating all hosts to all of their groups which are configured in the network.

The method may have the data being accessible by each router in the network.

For the method, an instance of the data may be stored locally at each router.

For the method, each instance of the data may be updated by a network manager computer associated with the network.

For the method, the another protocol may follow IGMP version 2 constructs and the request may follow IGMP version 3 constructs.

The method may have the another request generated at a requesting host in the network, which is received at a router connected to the requesting host.

The method may update a forwarding table associated with the group to reflect the request.

In a second aspect, a system for managing and converting a request in a protocol from another request formed in another protocol is provided. Therein, the request relates to changing a membership to a group and the group relates to a service provided by a host in a communication network. The system comprises a module for receiving the another request, data relating all hosts to all of their groups which are configured in the network, an identification module for identifying an associated host to the target group utilizing the data and a generation module for selectively generating the request containing a reference to the target group and the associated host. In the system, the another request identifies the group and does not uniquely identify the associated host.

The system may have the data accessible by each router in the network.

The system may store an instance of the data locally at each router; each instance of the data may be updated by a network manager computer associated with the network; the another protocol may follow IGMP version 2 constructs; and request may follow IGMP version 3 constructs.

The system further may comprise an evaluation module and a blocking module. The evaluation module evaluates access rights of the another request to the target group by utilizing membership information associated with the host and the target group; the blocking module selectively blocks the generation module from generating the request if the another request has access rights which are not acceptable.

In a third aspect, a method of evaluating and converting a request received in a protocol is provided. Therein, the request relates to joining a group and the group relates a service provided by a host in a communication network. The method comprises receiving the request, identifying a target group from the request, identifying an associated host to the target group, evaluating access rights of the request to the target group by utilizing membership information associated with the host and the target group, blocking the request if the request does not have acceptable access rights to the target group and generating another request containing a reference to the target group and the associated host if the access rights are acceptable. In the method, the request identifies the group and does not uniquely identify the associated host.

The method may have the request relating to a multicast transmission in the network; the another protocol may follow IGMP version 2 constructs; and the request may follow IGMP version 3 constructs.

In other aspects of the invention, various combinations and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals which may bear unique alphabetical suffixes in order to identify specific instantiations of like elements).

DETAILED DESCRIPTION OF EMBODIMENTS OF THE INVENTION

The description which follows, and the embodiments therein, are provided by way of illustrating an example, or examples, of particular embodiments of principles of the present invention. These examples are provided for the purpose of explanation, and not limitations, of those principles. In the description, which follows, like elements are marked throughout the specification and the drawings with the same respective reference numerals.

Prior Art Systems

Figure 1:
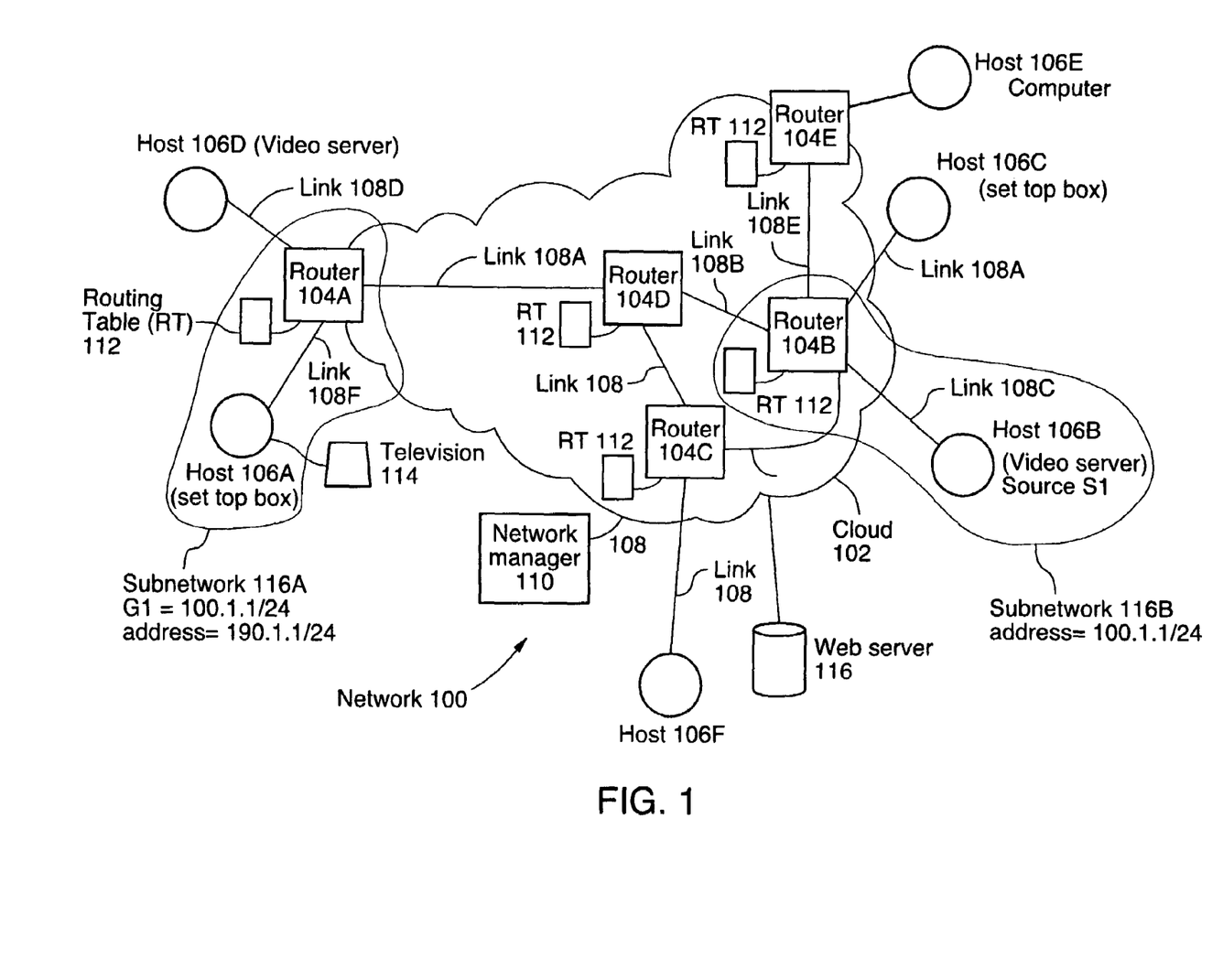
FIG. 1 is a block diagram of a communication network including a host and a router which operate in accordance with an embodiment of the present invention.

Referring to FIG. 1, network 100 is shown. Aspects of network 100 are shown to illustrate prior art systems and an embodiment of the invention.

For a prior art system, network 100 enables network elements to be connected through cloud 102 to other network elements. In particular, network cloud comprises a series of routers 104 connected by communication links 108. As shown, cloud 102 comprises routers 104A, 104B, 104C, 104D and 104E. When data traffic is sent from a source device to a destination device in through network cloud 102, a communication path through various routers 104 must be defined.

The architecture of network 102 is preferably IP. Accordingly, address constructs for data traffic and path generation constructs follow IP constructs. As such, when establishing a path, it is extended from the source device to the destination device in segments by sequentially finding a router which can send the data traffic to an adjacent router which is in a segment of a communication path towards the destination device. Each router has a routing table 112 providing a map of the topology of network cloud 102 to assist each router in identifying a next segment for a routing path for received data traffic. Network manager 110 is connected to cloud 102 and is responsible for maintaining and updating routing tables 112 of each router 104. Network manager 110 is connected to each router 104 in cloud 102 via a communication link 108.

Hosts 106 are computing devices and each host has an IP address. Each host 106 is connected to a router 104 which provides the point of connection for host 106 to network 100. For example, hosts 106A and 106D are connected to network 100 via router 104A; hosts 106B and 106C are connected to network 100 via router 104B; host 106E is connected to router 104E and host 106F is connected to router 104C. Connections are made via communication links 108. In other embodiments, the communication link between the hosts and their connecting router may be a broadband communication link such as an assymetric digital subscriber line, Ethernet connection, local multipoint data service (LMDS), or an asynchronous transfer mode (ATM) passive optical network (APON).

Some hosts may be used as storage sites for services (for example hosts 106B and 106D); a host may be a computer (host 106E and 106F) or set-top box (hosts 106A and 106C). A set-top box is used to request services from other hosts, such as multicast group transmissions. When configured to receive multicast transmissions, a set top box issues one or more requests to the router which connects it to network 100 to receive a multicast transmission corresponding to programming information selected by the user. In such an arrangement, when a user watching television changes channels, the set top box relays information concerning the channel change to the connecting router. Essentially, the set top box indicates to the connecting router that the previously viewed channel is no longer required and that a new multicast data stream corresponding to the channel to which the user has selected is required. Also, a personal computer may be configured as a host to request multicast groups in a similar manner as a set top box. Each of the hosts may be active or inactive at various points in time, and each of the hosts may request one or more multicast groups when active.

Therein, network 100 is used to provide, in part, access to digital video distribution services. A user of television 114 access network 100 to request downloads of specific video programs offered by the services from remote hosts 106. The user has a set-top box 106A connected to his display device (e.g. his television) and network 100; the set-top box 106A is a host and generates and transmits network requests for video programs initiated by the user. When the user wishes to download a video program, he accesses a menu (typically displayed on television 114) and selects the desired video program from the menu. The set-top box 106A then issues a request to network 100 to receive the video program. The request sent by the set-top box 106A is received by router 104A, as the point of connection to network 100; in turn, router 104A must forward the request towards the source of the video program to network 100. In network 100, the host which provides the video program is host 106B.

In network 100, hosts 106B and 106D utilize IP multicasting protocols to have network 100 distribute their programs to requesting set-top boxes or computers. Multicasting provides the benefit of conserving bandwidth usage in network 100. With multicasting, a host can send one copy of the multicasted data once to its server rather than repeatedly sending the same data to its router, then having its router send the data to each subscribing service.

An IP multicast session is defined by sending a packet to a reserved multicast IP address, which in IPv4, comprise addresses in the Class D range, encompassing addresses from 224.0.0.0 to 239.255.255.255. Accordingly, by examining the source and destination IP addresses from the IP header of a packet, a router can determine over which links 108 the packet is to be multicasted. A multicast address identifies a particular transmission session rather than a specific physical destination host. This ensures that a host is able to join an ongoing multicast session.

In the prior art, there are three protocols governing the interaction of hosts and routers operating multicast protocols.
1. IGMPv2 interoperating with PIM-SM network, which is a standardized legacy protocol;
2. IGMPv3 interoperating with PIM-SM network, which is a recently standardized protocol; and
3. IGMPv3 interoperating with PIM-SSM network, which is another recently standardized solution.

The following example illustrates operating aspects of the protocol #3 where IGMPv3 requests are translated into PIM-SSM requests. To assist implementation a multicast of the video program, each router maintains a multicast forwarding table (MFT) of hosts associated With each video program. Each entry in the table has two components: the first component provides information on the multicasted program, including its Group's IP address and the source host of the program; the second component is a list of outgoing links (108) associated with the program. Table A is a representative multicast forwarding table for router 104B in network 100.

TABLE A

| MFT Group | Multicast Receiving Links |
| --- | --- |
| Source S = host 106B (10.1.2.3) Group G = ABC (239.0.0.1) | Link 108A to Set-top box 106C, Link 108C to Router 104C |
| Source S = host 106D (10.2.3.4) Group G = NBC (239.0.0.9) | Link 108E to Router 104E |
| Source S = host 106B (10.1.2.3) Group G = HBO (239.0.0.5) | Link 108A to Set-top box 106C |

The MFT may be included as a part of routing table 112. The MFT needs to be updated as multicast destinations are added and dropped from a group. In multicast routing, routers communicate with each other to exchange information about multicast group membership information to neighboring routers.

Using IGMPv3, a host 106A generates a JR (S, G) to router 104A, where S is the IP address of host 106B and G is the group IP address of ABC. Router 104A does a lookup in the unicast routing table on address S to determine that the reverse path towards the source egresses out link 108A towards router 104D. Using PIM-SSM, STB router 104A will generate a join request command which has the syntax: JR (S, G). The behaviour of router 104D is similar to 104A and outside the scope of the behaviour being described. The resulting Multicast Forwarding Table at Router 104B is shown in Table B with the change highlighted.

TABLE B

| MFT Group | Multicast Receiving Links |
| --- | --- |
| Source S = host 106B (10.1.2.3) Group G = ABC (239.0.0.1) | Link 108A to Set-top box 106C, Link 108C to Router 104C, Link 108B to Router 104D (and on towards Host 106A) |
| Source S = host 106D (10.2.3.4) Group G = NBC (239.0.0.9) | Link 108E to Router 104E |
| Source S = host 106B (10.1.2.3) Group G = HBO (239.0.0.5) | Link 108A to Set-top box 106C |

As is discussed in detail below, an embodiment provides another system incorporating IGMPv2 with PIM-SSM network is provided.

Details of an Embodiment

Generally, the present invention provides a system and method for processing multicast group subscriptions for a multicast distribution group. When a router has received a request to join a multicast group, but has not been provided the identity of the source of the group, the router responsively obtains information from a group source table to identify the source for the group. Next, the router creates a request to join the distribution group and sends the request with the source information to the router associated with the group.

Again, referring to FIG. 1, the following example illustrates operating aspects of the embodiment. Unfortunately, legacy set-top boxes, such as set-top box 106A, can only generated IGMP v2 protocol commands and accordingly, cannot implement an IGMP v3 join request command. The embodiment provides an interface mechanism allowing legacy systems to use IGMPv2 protocols to interface with a network which uses PIM-SSM. Therein, when a legacy set-top box 106A generates an IGMPv2 JR (*, G) request, it is sent to STB router 104A, which then generates a corresponding PIM-SSM JR (S, G) request. Accordingly, when a JR (*, G) request is received by STB router 104A, it needs to identify a source S for the group G. After the source is identified, the join request JR (S, G) is sent towards the source host 106 according to standard PIM-SSM procedures. Generally, PIM-SSM operation is based on a unidirectional tree whose root is the Source and whose leaves are the receivers. A Source Specific Multicast (SSM) defines a "channel" identified by an (S, G) pair, from source S for SSM destination address G. The tree which models the group is called source-specific tree, or shortest-path tree (SPT).

An example of construction and use of a SPT for (S1, G1) by the embodiment is provided. Network 100 has receiver/host 106A on subnetwork 116A (addressed as 190.1.1/24). Source S1 is associated with subnetwork 116B and has address S1=100.1.1/24, G1=232.1.1.1. When multicast receiver 106A wishes to receive traffic for group G1 from source S1, it must send a notification to subnetwork 116B. Receiver 106A may send an IGMPv2 or IGMPv3 message to implement this notification to router 104A which, in the example, is the designated router in subnetwork 116A. Router 104A tracks groups which are being accessed by receivers 106 in its subnetwork 116A in a tree information base (TIB). When router 104A receives the IGMP message from receiver 106A, router 104A creates an (S1, G1) entry in its TIB and then places the Ethernet interface E0 in its outgoing interface list which is a list of interfaces that have joined the group.

Since router 104A had to create a new (S1, G1) state, router 104A must send a Join Request (S1, G1) command to the upstream router 104 towards source S1. Router 104A consults a multicast topology table to decide where to send the message. In the example, router 104A send a Join Request (S1,G1) message to router 104D. In this manner, the Join Request (S1,G1) message travels hop-by-hop towards S1 for the group G1 and, in each router 104 it passes through, a (S1,G1) state is instantiated. Eventually the Join Request (S1,G1) message either reaches S1, or reaches a router 104 that already has the (S1,G1) Join state.

Similarly, receivers 104 can request to leave a group. If all receivers 104 in subnetwork 202 leave a group, router 104, as the designated router, sends a Prune (S1,G1) message towards source S1 for multicast group G1.

In the embodiment, all of the source and group information is stored at each router 104. Management of the source and group information is performed by network manager 110 is a computer in network 100. The source and group information is preferably organized in a table. Network manager 110 maintains the contents of the table and ensures that information in the table is distributed to all routers 104 in network 100. For the embodiment, network manager 110 may use any known method to distribute the table over the links 108.

Table C is an exemplary table of the source and group information for a network. Any changes (additions and subtractions) to Table C need to be distributed to all routers 106. For example, if a new channel (e.g. FOX) starts transmitting from a video server, Table C needs to be modified to include the group and source address of the new channel by a network management operator and then the updated table needs to be distributed to each of the routers.

TABLE C

| Channel (Group G) | Source Host S |
|---|---|
| ABC (239.0.0.1) | Host 106B (10.1.2.3) |
| HBO (239.0.0.5) | Host 106B (10.1.2.3) |
| NBC (239.0.0.9) | Host 106D (10.2.3.4) |
| CBS (239.0.0.12) | Host 106D (10.2.3.4) |

Using the source and group information, the embodiment generates a JR (S, G) PIM-SSM command from a JR (*, G) IGMPv2 command as follows, using router 104A as a representative communication device to perform the generation. Router 104A has internal hardware and software modules to generate the command. In particular aspects of the modules are implemented in a state machine.

Initially, router 104A receives the IGMPv2 JR (*, G) message from host 106A. Router 104A needs to determine addressing information of the host of the program. To do this, router 104A accesses a source and group information table. As the STB router knows the identity of group G, the correlating source S can be identified from the source and group information table. With the source S information, STB router 104A builds a PIM-SSM join request placing the source address as determined from Table B as the "S" IP address in the PIM-SSM JR (S, G). The PIM-SSM is sent on a link as determined by a lookup of address S in the unicast routing table. This will be link 108 towards router 104D.

In order to facilitate distinguishing amongst groups, it is preferable that unique multicast addresses are provided to each group within the multicast groups in order to allow IGMP v1/v2 join requests.

In the embodiment, source and group information is used in conjunction with the "Reverse Path Forwarding" (RPF) lookup as defined in the PIM-SM and PIM-SSM standards. According to the PIM-SM standard, the reception of a (*, G) join results in a special RPF check based on a special router in the network named the Rendezvous Point (RP). As explained above, this step may not be performed by the embodiment, as it is not needed. In the embodiment, after the source and group information is examined to determine the source address (S), the source address (S) information is used to perform an RPF lookup to determine the outgoing interface used to reach address S. In the present example, the outgoing interface to reach address S (10.1.2.3) is link 108A, which is the link leading towards router 104D. The embodiment configures the datapath such that received (S, G) packets on link 108A are sent out towards host 106A. The embodiment then sends a PIM-SSM Join Request (S, G) on link 108A towards router 104D.

Router 104D receives the PIM-SSM Join Request (S, G) and passes the request to its state machine which performs another RPF lookup on the source address S1. The state machine determines that the outgoing interface to reach address S is link 108B leading towards router 104B. The embodiment configures the datapath such that received (S, G) packets on link 108B are sent out towards link 108A.

Next, the embodiment sends a PIM-SSM Join Request (S, G) on link 108B towards router 104B. Router 104B receives the request and passes the request to its state machine which performs a third RPF lookup on the source address S. This determines that the outgoing interface to reach address S is link 108C towards host 106B. The embodiment configures the datapath such that received (S, G) packets on link 108C are sent out towards link 108B. Now (S, G) traffic from host 106B traverses network 100 and reaches host 106A.

For a disconnect request, a similar protocol is followed. The disconnect requests must follow the same multicast tree topology as they were for the join requests.

Figure 2A:
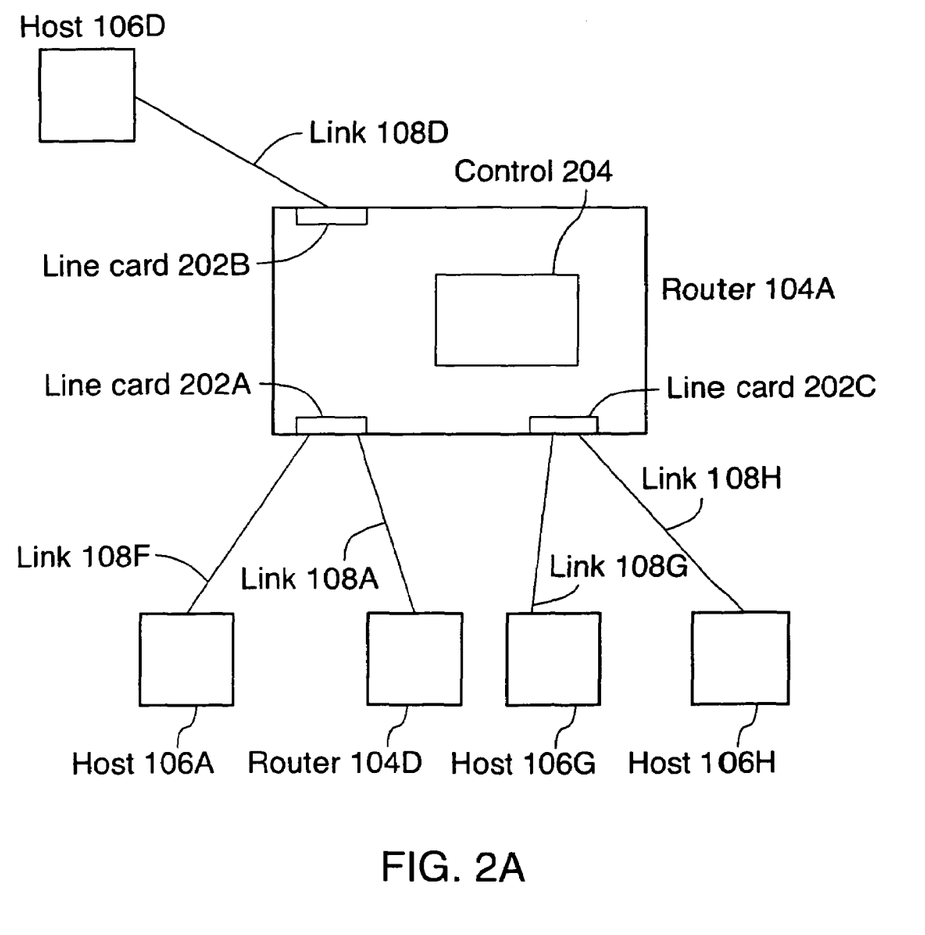
FIG. 2A is a block diagram of a router in the communication network of FIG. 1 illustrating operational aspects of the embodiment of FIG. 1.

Referring to FIG. 2A, further detail is provided on operating aspects of router 104A. Router 104A has line cards 202A, 202B and 202C providing interface points to external devices, such as other routers 104 and hosts 106. In particular, line card 202A provides (i) a connection via communication link 108F to host 106A; and (ii) a connection via communication link 108A to router 104D. Line card 202B provides a connection via link 108D to host 106D. In addition to links and hosts shown in FIG. 1, in FIG. 2A, line card 202C is shown as having an additional connection via link 108G to an additional host 106G and an additional connection via link 108H to an additional host 106H. Router 104A also has control module 204 which provides processing of the forwarding information. External devices join the group managed by router 104A in the following order: host 106B, router 104D, host 106G, and host 106H. Finally, host 106D transmits IP packets to group address G1. When host 106D joins the group, host 106D sends an IGMP join message to join group G1. Then, line card 202B detects join message and provides it line card 202A. It will be appreciated that other routers may be provided for the embodiment which do not use line cards.

Referring to FIG. 1, another embodiment provides for selectively enabled multicast to secure a network against denial of service attacks involving multicast traffic. Another device, besides the video server, would be able to send multicast traffic with a different source address but the same group address (S', G). When the set-top box joins group (*, G) implying the desire to connect to the (S, G) traffic from the video server, this feature restricts the traffic received by the set-top box to the (S, G) traffic. The (S', G) or any other (*, G) traffic is not sent to the set-top box.

For example, the ABC channel is carried on group address 239.0.0.1 which is carried by source host 106B using source address 10.1.2.3 is the authorized carrier of multicast traffic on group address 239.0.0.1. Another host 106D in the network is improperly or maliciously transmitting on group address 239.0.0.1. The host 106D must do this with its source address 10.2.3.4. The traffic is terminated and not forwarded by Router 104A as there are no subscribers to this improper channel. No other host can attempt to join this improper channel as on each router the group address 239.0.0.1 is mapped to the source address 10.1.2.3. There will be no requests generated for group address 239.0.0.1 with the source address 10.2.3.4.

Figure 2B:
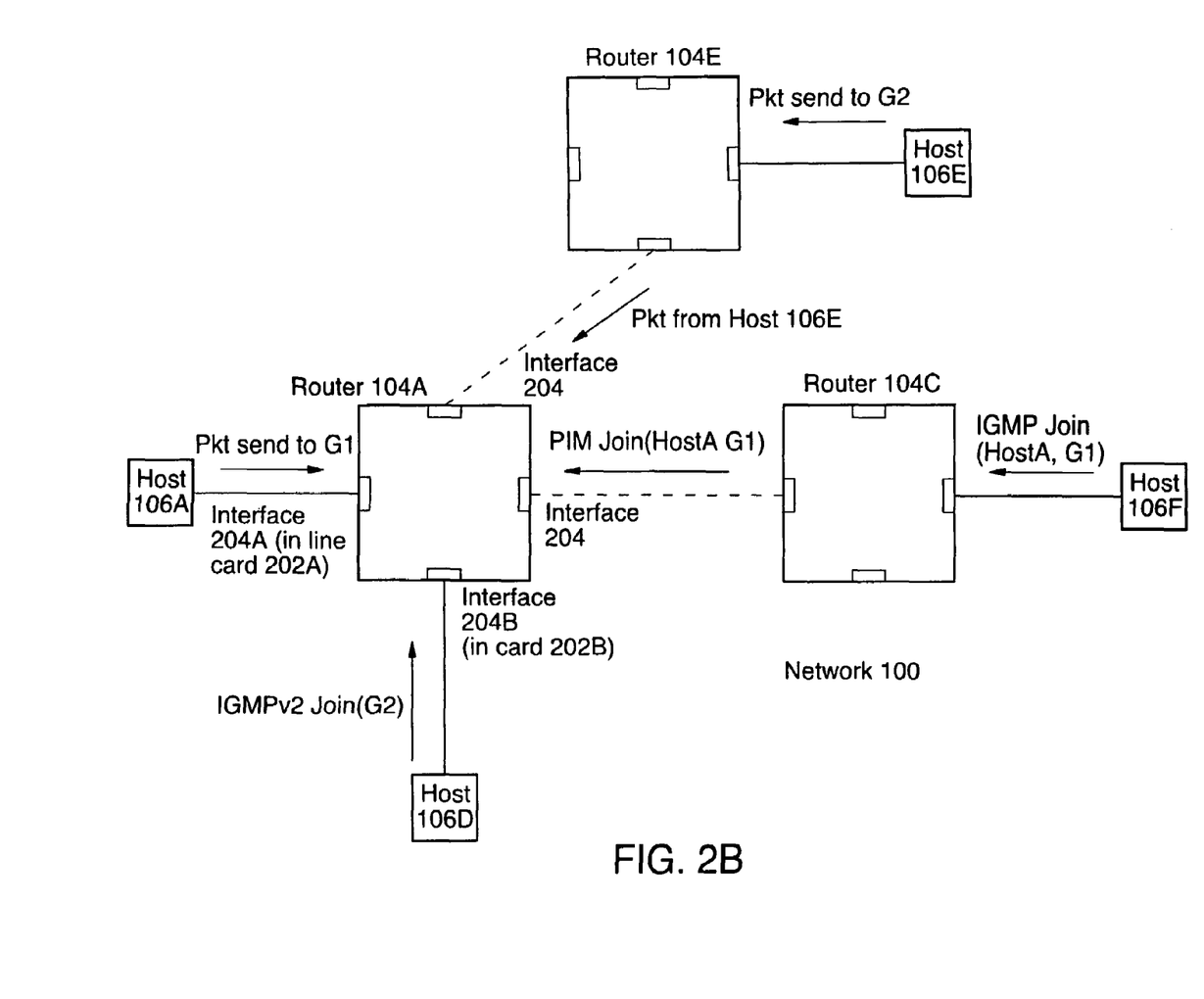
FIG. 2B is another block diagram of the router of FIG. 2A illustrating additional operational aspects of the embodiment of FIG. 1.

Specifically, referring to FIG. 2B, an embodiment also provides a transmission security feature which blocks unauthorized multicast transmissions. This security feature utilizes the conversion process of converting IGMPv2 join requests (*, G) to IGMPv3 join requests (S, G) to evaluate and exclude unknown malicious sources from transmitting on a given multi-cast group. The multicast source addresses can be configured through CLI. This feature may be used to prevent denial of service (DOS) attacks on a network source which supports multicast traffic.

As noted above, router 104 has line cards 202 which provide connection points between it and each connected host 106 and router 104. Within each line card 202, an interface 204 is provided, which may be selectively activated or deactivated by its router 104, depending on configuration constructs. In alternative embodiments, an interface 204 may be remotely controlled. When an interface 204 is deactivated, no data traffic received through its interface 204 will be forwarded by the router 104 to any other point in the network. Such data traffic may simply be discarded by the router 104.

Referring to FIGS. 1 and 2B, following are instances of packets being discarded when received from a multicast source (either from a host 106 or another router 104):

- If a multicast group associated with router 104A, for example, group G1, is empty, there is no interface associated with it. When host 106D transmits IP packets to router 104A via its interface 204, as Group G1 is empty, the interface is disabled and packets sent by host 106D to router 104A which is received through interface 204A, interface 204B is disabled as a multicast source. As such, multicast packets received from host 106D are discarded by router 104A.
- If interface 204A is disabled and if host 106F initiates a IGMP Join Request (host 106A, G1), router 106C sends a PIM-SSM Join request (104A, G1) towards router 104A, no multicast forwarding tree is created since interface 204A is disabled as a multicast source. As such, multicast packets received from host 106C are discarded by router 104A.
- If Group G2 is configured on router 104A, but has no receiver associated with it, then if host 106E transmits IP packets to multicast group address G2, router 104E forwards the packets to router 104A through interface 204A. However, here, there is no member in group G2 on router 104A; as such, router 104A discards packets since there is no receivers.
- Host 106D sends an IGMP Join Request (G2) using IGMPv2. However, the group (host 106D, G2) is not configured on router 104A. As a multicast forwarding tree is not created since source of G2 is unknown, packets are discarded by router 104A.

It will be appreciated that other configurations for router 104A may also be provided to prevent DOS attacks.

The foregoing embodiment has been described with a certain degree of particularity for the purposes of description. Those skilled in the art will understand that numerous variations and modifications may be made to the embodiments disclosed herein without departing from the scope of the invention.

What is claimed is:

1. A method implemented in a communication network for translating a join request from a host that uses a sparse mode multicast protocol for enabling the host to receive a service provided over the communication network by a source of a plurality of sources that use a source specific multicast protocol, comprising:

storing at a the router running inside the communication network coupled to the host a multicast forwarding table (MFT) providing multicast group addresses, source addresses associated with the group addresses, and routing information for the sources;

receiving a join request from the host, the join request identifying a group address for a multicast group that currently receives the service;

determining a source address for the source from the multicast forwarding table (MFT) using the group address; and, converting the join request to a translated join request that includes the source address along with the group address to thereby enable the host to join the group and receive the service from the source;

wherein the sparse mode multicast protocol and the source specific multicast protocol are network layer protocols.

2. The method of claim 1 wherein the group address in the multicast forwarding table (MFT) is updated with an address of the host upon the host joining the group.

3. The method of claim 1 wherein the source specific multicast protocol is a Protocol Independent Multicast-Single Source Multicast (PJM-SSM) protocol and the sparse mode multicast protocol is a Protocol Independent Multicast-Sparse Mode (PIM-SM) protocol.

4. The method of claim 3 wherein the join request is an Internet Group Management Protocol (JGMP) version v1/v2 compatible request and the translated join request is an IGMP version v3 compatible request.

5. The method of claim 1 wherein the service is distribution of video programming.

6. The method of claim 1 wherein the multicast forwarding table (MFT) is provided to a plurality of routers in the network.

7. The method of claim 1 wherein the group address in the multicast forwarding table (MFT) is updated by deleting an address of the host from the group address upon the host leaving the group.

8. The method of claim 1 wherein an entry in the multicast forwarding table (MFT) comprises: a first component which identifies the service, including an Internet Protocol (IP) address for the group and for the source; and, a second component that provides a list of outgoing links associated with the first component.

9. The method of claim 8 wherein the multicast forwarding table (MFT) is part of a routing table resident on the router.

10. A system for translating a join request from a host that uses a sparse mode multicast protocol for enabling the host to receive a service provided over a communications network by a source of a plurality of sources that use a source specific multicast protocol, comprising:

a processor coupled to memory and to an interface to the network; and, modules within the memory and executed by the processor, the modules including:

a module for storing a multicast forwarding table (MFT) providing multicast group addresses, source addresses associated with the group addresses, and routing information for the sources;

a module for receiving the join request;

an identification module for identifying in the join request a group address for a multicast group that currently receives the service;

a generation module for generating from the multicast forwarding table (MFT) a source address for the source corresponding to the group address; and, a module for converting the join request to a translated join request that includes the source address along with the group address to thereby enable the host to join the group and receive the service from the source;

wherein the sparse mode multicast protocol and the source specific multicast protocol are network layer protocols.

11. The system of claim 10 wherein the source is a video server and the host is a set-top box connected to a video monitor.

12. The system of claim 10 wherein the host is one of a set-top box connected to a video monitor and a personal computer.

13. The system of claim 10 wherein the network is a Protocol Independent Multicast—Single Source Multicast (PIM-SSM) network, the source uses Internet Group Management Protocol (IGMP) version v3 to connect to the network, and the host uses IGMP version v1/v2 to connect to the network.

14. The system of claim 10 wherein the module for storing updates the group address in the multicast forwarding table (MFT) with an address of the host upon the host joining the service.

15. The system of claim 10 wherein the join request is an Internet Group Management Protocol (IGMP) version v1/v2 compatible request and the translated join request is an IGMP version v3 compatible request.

* * * * *

UNITED STATES PATENT AND TRADEMARK OFFICE
CERTIFICATE OF CORRECTION

| | | |
|---|---|---|
| PATENT NO. | : 7,519,662 B2 | Page 1 of 1 |
| APPLICATION NO. | : 11/698082 | |
| DATED | : April 14, 2009 | |
| INVENTOR(S) | : David A. Watkinson | |

It is certified that error appears in the above-identified patent and that said Letters Patent is hereby corrected as shown below:

Column 10, line 15 "PJM-SSM" should be change to --PIM-SSM--

Column 10, line 19 "JGMP" should be change to --IGMP--

Signed and Sealed this

Twenty-first Day of July, 2009

JOHN DOLL
*Acting Director of the United States Patent and Trademark Office*